US009635627B2

(12) United States Patent
Krishnamoorthy

(10) Patent No.: US 9,635,627 B2
(45) Date of Patent: Apr. 25, 2017

(54) CONNECTION RELIABILITY AND MANAGING INTERFERENCE CREATED BY BEAMFORMING

(71) Applicant: NOKIA SOLUTIONS AND NETWORKS OY, Espoo (FI)

(72) Inventor: Arvind Krishnamoorthy, Barlett, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/539,722

(22) Filed: Nov. 12, 2014

(65) Prior Publication Data
US 2016/0135158 A1  May 12, 2016

(51) Int. Cl.
*H04W 72/04* (2009.01)
*H04W 40/06* (2009.01)
*H04W 56/00* (2009.01)
*H04L 5/00* (2006.01)
*H04B 7/06* (2006.01)

(52) U.S. Cl.
CPC ........ *H04W 56/001* (2013.01); *H04B 7/0689* (2013.01); *H04L 5/00* (2013.01)

(58) Field of Classification Search
CPC ............. H04W 72/0406; H04W 40/06; H04W 56/001; H04L 5/00; H04B 7/0689
USPC ........................................................ 370/329
See application file for complete search history.

(56) References Cited

U.S. PATENT DOCUMENTS

| | | | | |
|---|---|---|---|---|
| 6,369,756 | B1* | 4/2002 | Wang | H04B 7/0615 342/367 |
| 2010/0075592 | A1* | 3/2010 | Kim | H04W 56/001 455/3.01 |
| 2011/0149894 | A1* | 6/2011 | Luo | H04W 16/02 370/329 |
| 2012/0190378 | A1* | 7/2012 | Han | H04B 7/0639 455/452.2 |
| 2013/0115999 | A1* | 5/2013 | Sirotkin | H04B 7/0617 455/522 |
| 2013/0223409 | A1* | 8/2013 | Jung | H04W 36/20 370/331 |
| 2013/0265945 | A1* | 10/2013 | He | H04L 27/2657 370/329 |

(Continued)

OTHER PUBLICATIONS

Bernhard Shultz, "LTE Transmission Modes and Beamforming White Paper," Oct. 2011, Rohde and Schwarz.*

*Primary Examiner* — Mark Rinehart
*Assistant Examiner* — Kenneth P Hunt
(74) *Attorney, Agent, or Firm* — Squire Patton Boggs (US) LLP

(57) ABSTRACT

Various communication systems may benefit for techniques and devices for improved connection reliability and interference management. For example, communication systems of the long term evolution (LTE) of the third generation partnership project (3GPP) or LTE advanced (LTE-A) may benefit from systems and methods for improving connection reliability and managing interference created by beamforming. For example, a method may include preparing at least one interference-protected message to transmit. The method may also include transmitting the at least one interference-protected message preferentially on at least one physical resource block on which beamforming is not allowed.

20 Claims, 4 Drawing Sheets

(56) References Cited

U.S. PATENT DOCUMENTS

2014/0112254 A1\* 4/2014 Lindoff ............... H04W 74/002
　　　　　　　　　　　　　　　　　　　　　　　370/328
2015/0003343 A1\* 1/2015 Li ........................ H04W 52/42
　　　　　　　　　　　　　　　　　　　　　　　370/329

\* cited by examiner

CONNECTION RELIABILITY AND MANAGING INTERFERENCE CREATED BY BEAMFORMING

BACKGROUND

Field

Various communication systems may benefit for techniques and devices for improved connection reliability and interference management. For example, communication systems of the long term evolution (LTE) of the third generation partnership project (3GPP) or LTE advanced (LTE-A) may benefit from systems and methods for improving connection reliability and managing interference created by beamforming.

Description of the Related Art

In an LTE or LTE-A network, before a user equipment can start calls or data traffic with the network, the user equipment (UE) has to listen for certain broadcast information from a network element, such as an evolved Node B (eNB). Call setup success rate is key performance indicator (KPI) for a deployed network. For reliable call setup and access, the access procedure should itself be highly reliable.

In LTE, like other cellular technologies, the call setup procedure involves a series of steps as follows: UE acquires the LTE network; UE decodes the system information broadcasted to all UEs within the cell using a broadcast control channel (BCCH) which provides the UE with the basic information it needs to know how to access this eNB/network; UE sends a random access request (RACH) to the eNB (MSG1); eNB responds to the RACH with MSG2 (Random Access Response) that includes UL grant allowing the UE to transmit a connection request, Temporary C-RNTI and timing advance value; using the UL grant that arrives with MSG2, UE sends RRC connection request to eNB (MSG3); eNB responds with connection setup using the Physical Downlink Shared Channel (PDSCH) (MSG4 or Contention Resolution Message); eNB configures other aspects of the UE, such as configuring the transmission mode, other channel attributes and parameters such as the Sound Reference Signal (SRS) configuration to use, additional radio bearers to use, handover parameters and thresholds, etc.; and UE is now connected and able to send and receive user data using the Dedicated Traffic Channel (DTCH).

In order to be spectrally efficient and support large data throughputs, the 3GPP specification has defined many advanced multi-antenna transmission modes. In TD-LTE, transmit modes 7 and 8 (TM7 and TM8) employ beamforming techniques. These advanced transmission modes attempt to drive RF signals from multiple antennae at the eNB with different amplitudes and phases so that these signals combine coherently at the UE receiver. The amplitude and phase applied to each antenna element is called the beamforming weight. With a properly chosen beamforming weight, the UE receives his desired signal at a much higher signal strength compared to the noise floor and other interference sources. The ratio of desired signal power to the sum of noise and interference power is referred to as the Signal to Noise plus Interference ratio (SINR). A high SINR is viewed as indicating good channel quality, which is required for either link—uplink (UL) or downlink (DL)—to support high throughput transmissions.

In TD-LTE, due to the reciprocity assumption between the DL channel and UL channel, the eNB can compute the beamforming weight to be applied to a specific UE from the UL pilot symbols that the UE is configured to transmit periodically. The UL pilot symbols that are transmitted by the UE for the purpose of sounding the channel are called Sounding Reference Signals (SRS). Once the eNB receives the SRS from the UE, the eNB is able to form the channel covariance matrix and perform an eigenvalue decomposition of the channel covariance matrix to determine the ideal beamforming weights to use for that particular UE. Beamforming has the ability to concentrate and coherently combine the transmitted signal from multiple eNB antennae to get a higher received signal strength.

In order to calculate the special beamforming weight to a particular UE, the UE first needs to be connected to the eNB and configured to transmit the SRS signal. Therefore, until the UE attaches to a particular cell, it receives all the broadcast information in a non-beamformed transmission mode that uses a broad sector beam. In a dense TD-LTE network deployment that employs TM7 and/or TM8, when a UE close to the boundary between two cells attempts to connect to a cell, it is likely to be heavily interfered with by DTCH transmissions from an adjacent cell that is employing beamforming. The resulting interference can lower the SINR of the broadcast signal and common control channel to such a large extent that the UE may not be able to connect to the desired cell. This reduces the connection reliability and call setup success rates to unacceptable levels.

As an example, FIG. 1 illustrates the situation that can occur. Specifically, FIG. 1 illustrates an attach challenge for a user equipment in adjacent cell. As shown in FIG. 1, UE#1 in Cell 1 may be operating in TM7/8 mode, with a UE-specific beam pattern. This beam pattern may interfere with the broadcast signal in Cell 2 to UE#2, which is trying to attach to Cell 2.

The interference issue can be exacerbated when the eNB antenna that is deployed has antenna spacing larger than $0.5\lambda$, where $\lambda$ is the wavelength corresponding to the carrier frequency used. When the spacing is larger than $0.5\lambda$, large grating lobes may occur, that can produce a lot of interference in adjacent cells.

FIG. 2 illustrates interference in adjacent cell due to grating lobe. An example of the grating lobe issue can be observed in FIG. 2. For example, when Cell#1 is using beamforming weights directed towards a user at 50° from the boresight of the antenna array, a large grating lobe can be produced at −45° causing approximately 8-10 dB of interference to UEs at the edge of Cell#2.

SUMMARY

According to certain embodiments, a method can include preparing at least one interference-protected message to transmit. The method can also include transmitting the at least one interference-protected message preferentially on at least one physical resource block on which beamforming is not allowed.

In certain embodiments, an apparatus can include at least one processor and at least one memory including computer program code. The at least one memory and the computer program code can be configured to, with the at least one processor, cause the apparatus at least to prepare at least one interference-protected message to transmit. The at least one memory and the computer program code can also be configured to, with the at least one processor, cause the apparatus at least to transmit the at least one interference-protected message preferentially on at least one physical resource block on which beamforming is not allowed.

A non-transitory computer-readable medium can, in certain embodiments, be encoded with instructions that, when executed in hardware, perform a process. The process can include preparing at least one interference-protected message to transmit. The process can also include transmitting the at least one interference-protected message preferentially on at least one physical resource block on which beamforming is not allowed.

An apparatus, according to certain embodiments, can include means for preparing at least one interference-protected message to transmit. The apparatus can also include means for transmitting the at least one interference-protected message preferentially on at least one physical resource block on which beamforming is not allowed.

A computer program product, in certain embodiments, can encode instructions for perform a process. The process can include preparing at least one interference-protected message to transmit. The process can also include transmitting the at least one interference-protected message preferentially on at least one physical resource block on which beamforming is not allowed.

BRIEF DESCRIPTION OF THE DRAWINGS

For proper understanding of the invention, reference should be made to the accompanying drawings, wherein.

DETAILED DESCRIPTION

Certain embodiments may eliminate or reduce the interference issues that are faced by a user equipment (UE) in a cell adjacent to a cell that is beamforming, during attach. Certain embodiments may similarly help when non-beamformed transmission mode is being used for DL transmissions.

The 3GPP specification Rel. 8 conventionally requires a Primary Synchronization Signal (PSS) and a Secondary Synchronization Signal (SSS) that are transmitted twice each within each ten millisecond period. In TD-LTE, the PSS is transmitted in the third symbol of the third and the thirteenth slot of a time division duplex (TDD) frame and the SSS is required to be transmitted three symbols earlier than the PSS signal. The PSS and the SSS both occupy the central six physical resource blocks (PRBs) of the downlink subframe in which they are transmitted.

Figure 1:
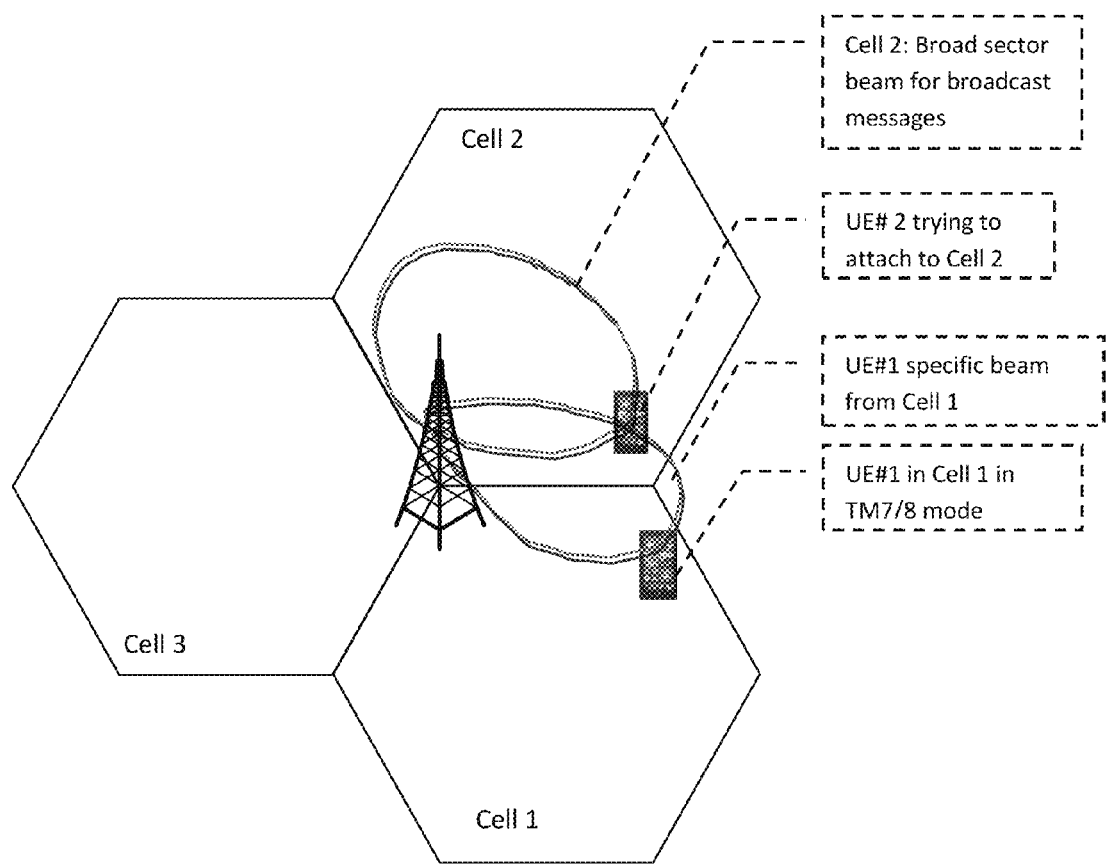
FIG. 1 illustrates an attach challenge for a user equipment in adjacent cell.
Figure 2:
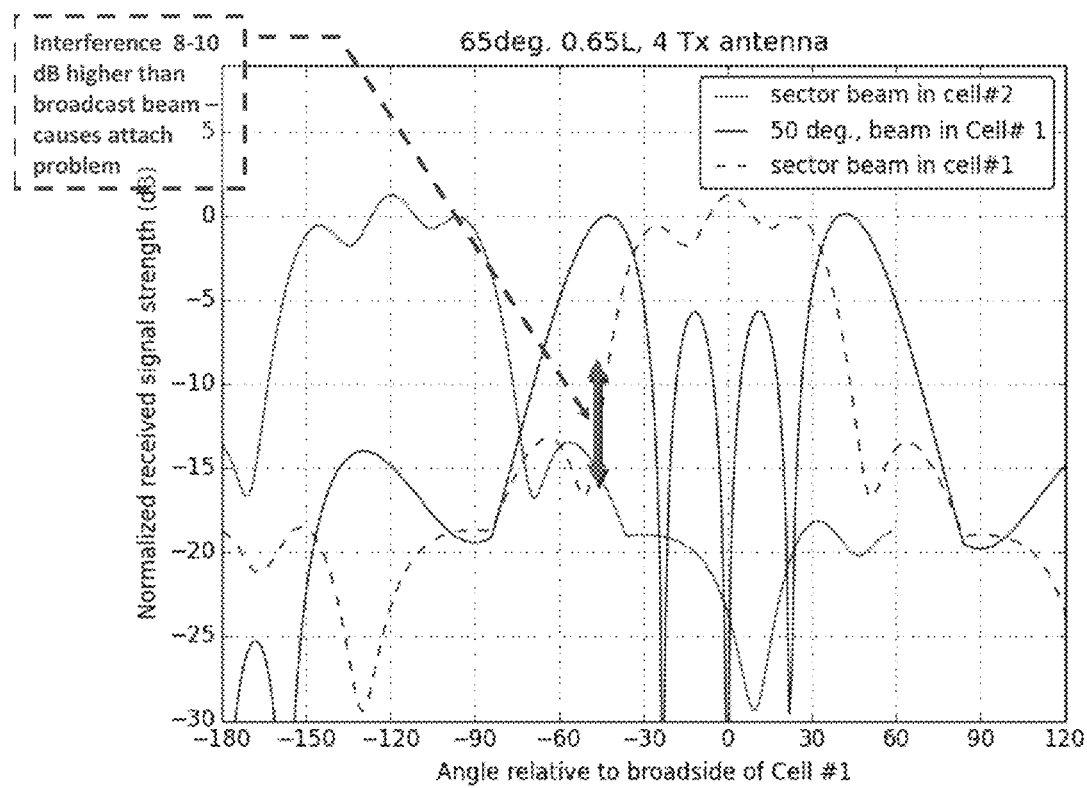
FIG. 2 illustrates interference in adjacent cell due to grating lobe.

The MSG2 and the MSG4 responses from the eNB to the UE may be important steps in the Random Access Procedure. As shown in FIG. 1, if the transmission of MSG2 or MSG4 by Cell#2 collides with a beamformed transmission by Cell#1 to UE#1, then these messages can get drowned in interference. As can be seen from FIG. 2, it is possible that the interference is actually 8-10 dB higher than the desired signal in Cell#2. This may prevent the UE from successfully attaching to the cell.

The conventional 3GPP specification prevents the transmission of beamformed signals in the RBs that contain the PSS and SSS. Thus the central 6 PRBs represent frequency and time resources on the physical data shared channel (PDSCH) that are never affected by beamformed interference from adjacent cells.

According to certain embodiments, all MSG2s and MSG4s are preferentially transmitted in the PRBs that are occupied by the PSS and SSS. Since these resources do not contain any beamformed interference, they may have good reliability. The PSS and SSS together represent at the minimum 24 PRBs of transmission opportunities for all RACH response messages. Depending on the bandwidth of the deployed system and the Resource Allocation Type (RAT) used, there might be more RBs available for transmission of the MSG2 and MSG4 as proposed above.

Thus, in certain embodiments, there is a scheduler change to preferentially schedule all MSG2/MSG4 in central PRBs that also contain the PSS or the SSS. This approach may avoid degradation in throughput in the cell employing beamforming, because the 3GPP specification prevents the transmission of beamformed signals in the RBs that contain the PSS and SSS.

Figure 3:
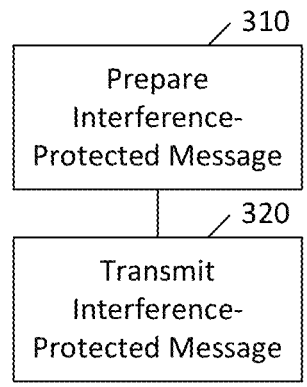
FIG. 3 illustrates a method according to certain embodiments.

FIG. 3 illustrates a method according to certain embodiments. As shown in FIG. 3, a method can include, at 310, preparing at least one interference-protected message to transmit. The method can also include, at 320, transmitting the at least one interference-protected message preferentially on at least one physical resource block on which beamforming is not allowed. For example, the transmitting can include transmitting the at least one interference-protected message preferentially on at least one physical resource block on which beamforming is not allowed in any cell, namely either in the cell that is transmitting the interference-protected message or any nearby cell. Thus, this may be a block for beamforming is not allowed anywhere, or at least not anywhere that could provide interference. The interference-protected message may be a message that is to be protected from beamformed transmissions from a neighboring cell.

The at least one physical resource block can include at least one physical resource block that is occupied by at least one of a primary synchronization signal or a secondary synchronization signal. For example, the at least one physical resource block comprises at least one of six central physical resource blocks of a downlink subframe.

The at least one interference-protected message can include at least one of a MSG2 or a MSG4. More particularly, in certain embodiments, the at least one interference-protected message comprises all MSG2s and MSG4s of a network element. Thus, in certain embodiments, the same physical resource block may be used for PSS or SSS in one cell and for MSG2/MSG4 in another cell. The network element may be an evolved Node B or another base station, access point, relay node, or gateway node.

The transmitting can include broadcasting the at least one interference-protected message. The at least one interference-protected message can include at least one message to be broadcasted in downlink. The transmitting can include broadcasting the at least one interference-protected message in a broad sector beam.

Figure 4:
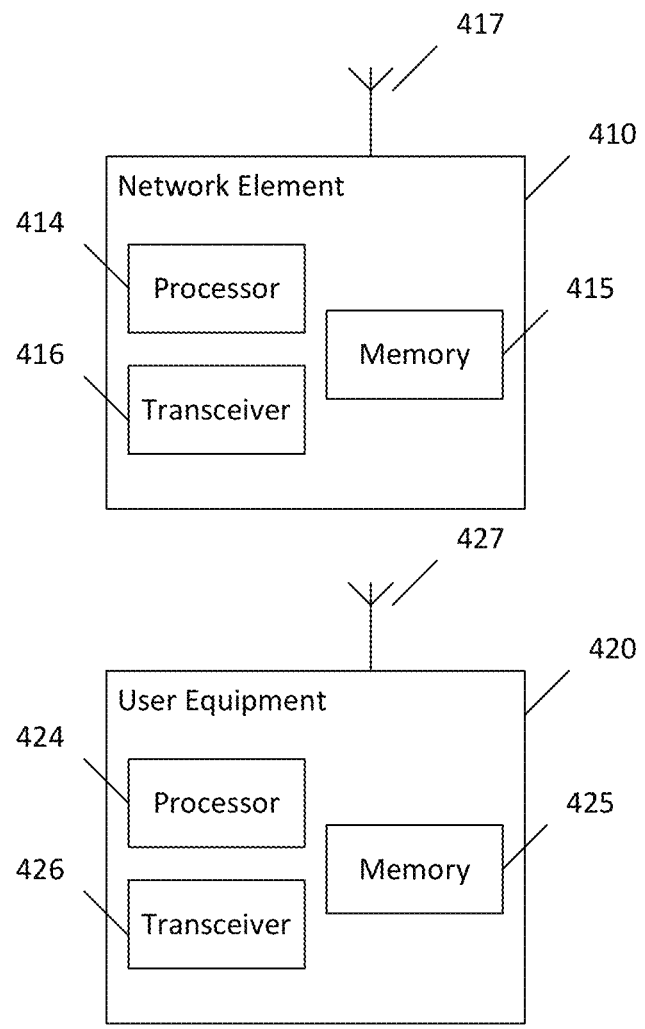
FIG. 4 illustrates a system according to certain embodiments.

FIG. 4 illustrates a system according to certain embodiments of the invention. It should be understood that each block of the flowchart of FIG. 3 may be implemented by various means or their combinations, such as hardware, software, firmware, one or more processors and/or circuitry. In one embodiment, a system may include several devices, such as, for example, network element 410 and user equipment (UE) or user device 420. The system may include more than one UE 420 and more than one network element 410, although only one of each is shown for the purposes of illustration. A network element can be an access point, a base station, an eNode B (eNB), or any other network element.

Each of these devices may include at least one processor or control unit or module, respectively indicated as 414 and 424. At least one memory may be provided in each device, and indicated as 415 and 425, respectively. The memory may include computer program instructions or computer code contained therein. One or more transceiver 416 and 426 may be provided, and each device may also include an antenna, respectively illustrated as 417 and 427. Although only one antenna each is shown, many antennas and multiple antenna elements may be provided to each of the devices. For example, a two-dimensional array of antenna elements may be used by network element 410. Other configurations of these devices, for example, may be provided. For example, network element 410 and UE 420 may be additionally configured for wired communication, in addition to wireless communication, and in such a case antennas 417 and 427 may illustrate any form of communication hardware, without being limited to merely an antenna.

Transceivers 416 and 426 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is as software that can run on a server.

A user device or user equipment 420 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 420 may be a sensor or smart meter, or other device that may usually be configured for a single location.

In an exemplifying embodiment, an apparatus, such as a node or user device, may include means for carrying out embodiments described above in relation to FIG. 3.

Processors 414 and 424 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 415 and 425 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 410 and/or UE 420, to perform any of the processes described above (see, for example, FIG. 3). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 4 illustrates a system including a network element 410 and a UE 420, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

LIST OF ABBREVIATIONS

LTE—Long Term Evolution
LTE-A—Long Term Evolution—Advanced
PDCCH—Physical Downlink Control Channel
PDSCH—Physical Downlink Shared Channel
PUSCH—Physical Uplink Shared Channel
eNB—evolved (LTE) Node-B (basestation)
RB—Resource block
PRB—Physical Resource block
DL—Downlink
UE—User Equipment
UL—Uplink
SINR—Signal to Interference plus Noise Ratio
SRS—Sounding Reference Signal
CCE—Control Channel Element
CCCH—Common Control Channel
BCCH—Broadcast Control Channel
DCCH—Dedicated Control Channel DTCH—Dedicated Traffic Channel
RAR—Random Access Response
RA-RNTI—Random Access Radio Network Temporary Identity
RACH—Random Access Channel
SIBn—System Information Block "n"
MIB—Master Information Block

I claim:

1. A method, comprising:
preparing at least one interference-protected message to transmit, wherein the at least one interference-protected message comprises at least one of a MSG2 or a MSG4; and
transmitting the at least one interference-protected message preferentially on at least one physical resource block on which beamforming is not allowed in any cell having overlapping coverage with a cell in which the interference-protected message is being transmitted,
wherein the at least one physical resource block comprises at least one physical resource block that is occupied by at least one of a primary synchronization signal or a secondary synchronization signal.

2. The method of claim 1, wherein the at least one physical resource block comprises at least one of six central physical resource blocks of a downlink subframe.

3. The method of claim 1, wherein the at least one interference-protected message comprises all MSG2s and MSG4s of a network element.

4. The method of claim 1, wherein the transmitting comprises broadcasting the at least one interference-protected message.

5. The method of claim 1, wherein the at least one interference-protected message comprises at least one message to be broadcasted in downlink.

6. The method of claim 1, wherein the transmitting comprises broadcasting the at least one interference-protected message in a broad sector beam.

7. An apparatus, comprising:
at least one processor; and
at least one memory including computer program code,
wherein the at least one memory and the computer program code can be configured to, with the at least one processor, cause the apparatus at least to
prepare at least one interference-protected message to transmit, wherein the at least one interference-protected message comprises at least one of a MSG2 or a MSG4; and
transmit the at least one interference-protected message preferentially on at least one physical resource block on which beamforming is not allowed in any cell having overlapping coverage with a cell in which the interference-protected message is being transmitted,
wherein the at least one physical resource block comprises at least one physical resource block that is occupied by at least one of a primary synchronization signal or a secondary synchronization signal.

8. The apparatus of claim 7, wherein the at least one physical resource block comprises at least one of six central physical resource blocks of a downlink subframe.

9. The apparatus of claim 7, wherein the at least one interference-protected message comprises all MSG2s and MSG4s of a network element.

10. The apparatus of claim 9, wherein the network element comprises an evolved Node B.

11. The apparatus of claim 7, wherein the transmitting comprises broadcasting the at least one interference-protected message.

12. The apparatus of claim 7, wherein the at least one interference-protected message comprises at least one message to be broadcasted in downlink.

13. The apparatus of claim 7, wherein the transmitting comprises broadcasting the at least one interference-protected message in a broad sector beam.

14. A non-transitory computer-readable medium encoded with instructions that, when executed in hardware, perform a process, the process comprising:
preparing at least one interference-protected message to transmit, wherein the at least one interference-protected message comprises at least one of a MSG2 or a MSG4; and
transmitting the at least one interference-protected message preferentially on at least one physical resource block on which beamforming is not allowed in any cell having overlapping coverage with a cell in which the interference-protected message is being transmitted,
wherein the at least one physical resource block comprises at least one physical resource block that is occupied by at least one of a primary synchronization signal or a secondary synchronization signal.

15. The non-transitory computer-readable medium of claim 14, wherein the interference-protected message is to be protected from beamformed transmissions from a neighboring cell.

16. The non-transitory computer-readable medium of claim 14, wherein the at least one physical resource block comprises at least one of six central physical resource blocks of a downlink subframe.

17. The non-transitory computer-readable medium of claim 14, wherein the at least one interference-protected message comprises all MSG2s and MSG4s of a network element.

18. The non-transitory computer-readable medium of claim 14, wherein the transmitting comprises broadcasting the at least one interference-protected message.

19. The non-transitory computer-readable medium of claim 14, wherein the at least one interference-protected message comprises at least one message to be broadcasted in downlink.

20. The non-transitory computer-readable medium of claim 14, wherein the transmitting comprises broadcasting the at least one interference-protected message in a broad sector beam.

* * * * *